US008243928B2

(12) United States Patent
Park et al.

(10) Patent No.: US 8,243,928 B2
(45) Date of Patent: Aug. 14, 2012

(54) AUTHENTICATION METHOD IN COMMUNICATION SYSTEM

(75) Inventors: Young-Jun Park, Seoul (KR); Min-Young Ahn, Seongnam-si (KR); Kug Shin, Seoul (KR); Kwang-Jo Kim, Daejeon (KR); Kyu-Suk Han, Seoul (KR)

(73) Assignees: Samsung Electronics Co., Ltd., Suwon-si (KR); Information and Communications University Research and Cooperation Group, Daejeon (KR)

( * ) Notice: Subject to any disclaimer, the term of this patent is extended or adjusted under 35 U.S.C. 154(b) by 982 days.

(21) Appl. No.: 12/221,866

(22) Filed: Aug. 7, 2008

(65) Prior Publication Data

US 2009/0041250 A1     Feb. 12, 2009

(30) Foreign Application Priority Data

Aug. 9, 2007    (KR) ........................ 10-2007-0080315

(51) Int. Cl.
*H04K 1/00*      (2006.01)
(52) U.S. Cl. .......... 380/247; 380/44; 380/270; 455/411; 713/169; 713/175; 713/178; 713/171
(58) Field of Classification Search .................... 380/44, 380/247, 270; 713/169, 175, 178
See application file for complete search history.

(56) References Cited

U.S. PATENT DOCUMENTS

| | | | | |
|---|---|---|---|---|
| 5,241,599 A | * | 8/1993 | Bellovin et al. ............... | 713/171 |
| 5,661,806 A | * | 8/1997 | Nevoux et al. ................ | 380/247 |
| 7,007,164 B1 | * | 2/2006 | Euchner ........................ | 713/168 |
| 7,773,972 B2 | * | 8/2010 | Croome et al. ............... | 455/411 |
| 7,779,479 B2 | | 8/2010 | Lee et al. | |
| 7,848,522 B2 | * | 12/2010 | Haverinen .................... | 380/247 |
| 2001/0056535 A1 | * | 12/2001 | Vanstone et al. ............. | 713/169 |
| 2002/0077078 A1 | * | 6/2002 | Antti ............................. | 455/410 |
| 2003/0041241 A1 | * | 2/2003 | Saito ............................. | 713/169 |
| 2003/0163692 A1 | * | 8/2003 | Kleinsteiber et al. ......... | 713/169 |
| 2004/0014423 A1 | * | 1/2004 | Croome et al. .............. | 455/41.2 |
| 2004/0228492 A1 | * | 11/2004 | Park ............................. | 380/277 |
| 2006/0205388 A1 | * | 9/2006 | Semple et al. ................ | 455/411 |
| 2006/0206710 A1 | | 9/2006 | Gehrmann | |
| 2009/0190562 A1 | | 7/2009 | Liu | |

FOREIGN PATENT DOCUMENTS

KR    10-2005-0094318      9/2005
KR    10-2006-0121882     11/2006

* cited by examiner

*Primary Examiner* — April Shan

(57) ABSTRACT

An authentication method is provided in which a first portable device generates and transmits a first random number and a first timestamp to a first USIM in the first portable device; the first USIM calculates a first sign for the first portable device; the first portable device requests authentication for authenticated communication from a second portable device through transmission of the first random number, the first timestamp, and the first sign to the second portable device; the second portable device generates a second random number and a second timestamp and transmits the information to a second USIM in the second portable device; the second USIM generates a second sign for the second portable device and a second personal key which the second portable device transmits to the first portable device; the first portable device then transmits the information to the first USIM which generates a first personal key for authenticated communication.

21 Claims, 3 Drawing Sheets

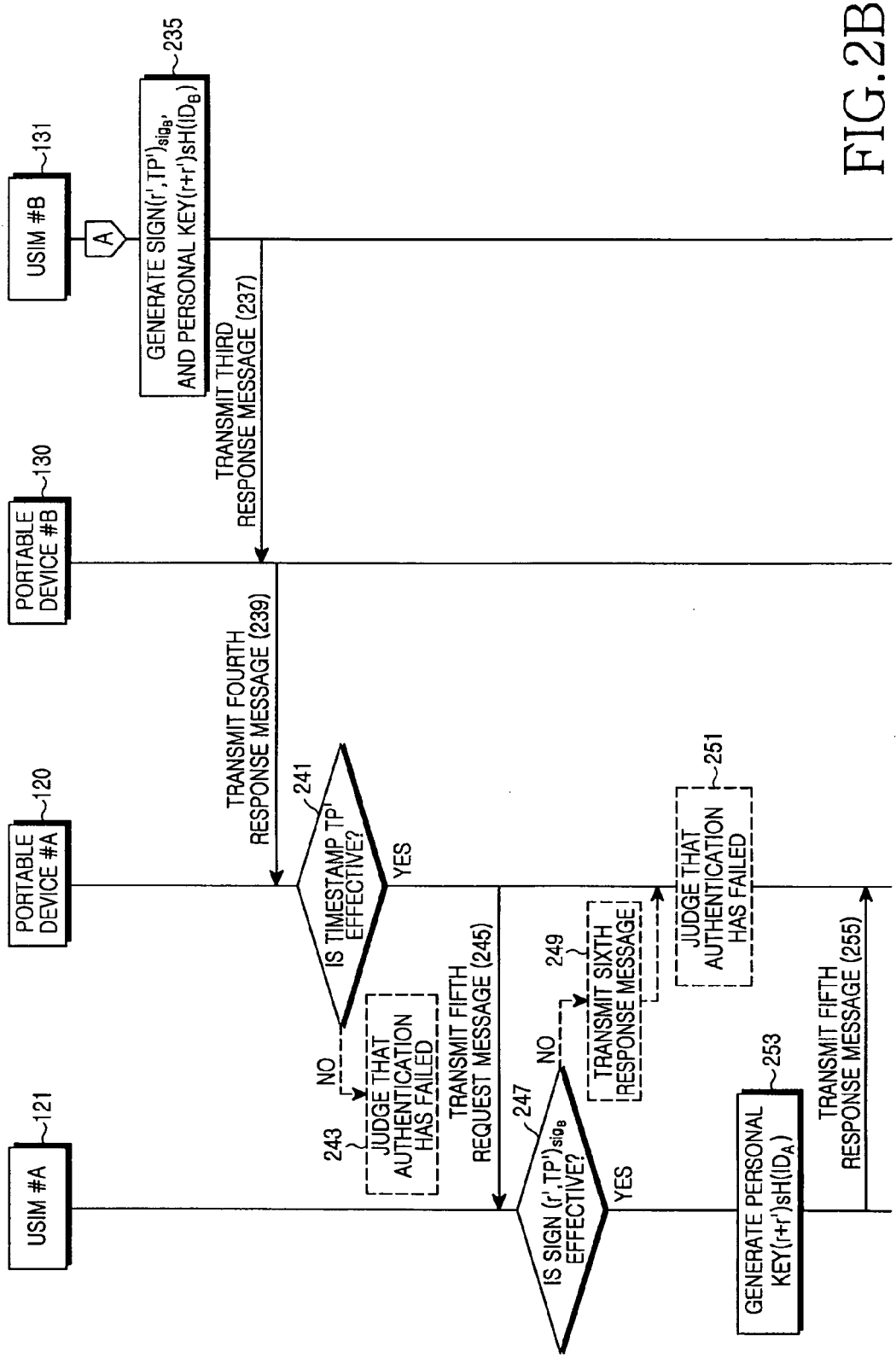

AUTHENTICATION METHOD IN COMMUNICATION SYSTEM

CROSS-REFERENCE TO RELATED APPLICATION(S) AND CLAIM OF PRIORITY

The present application claims priority to an application entitled "Authentication Method in Communication System", filed in the Korean Industrial Property Office on Aug. 9, 2007 and assigned Serial No. 2007-80315, the contents of which are hereby incorporated by reference.

TECHNICAL FIELD OF THE INVENTION

The present invention relates generally to a communication system. More particularly, the present invention relates to an authentication method in a communication system.

BACKGROUND OF THE INVENTION

Current communication systems use a symmetric key-based authentication and key agreement (hereinafter referred to as "AKA") method as a user authentication and key exchange method. However, in the case of using the symmetric key-based AKA method, a user identifier (hereinafter referred to as "ID") is exposed, and thus user tracking becomes possible.

Recently, research for solving the problem caused by the use of the symmetric key-based AKA method (i.e., the problem that the user ID is exposed and user tracking becomes possible through the use of a public key-based AKA method) has been actively performed.

Also, in the case of using the symmetric key-based AKA method, the amount of computation that is performed in a user's universal subscriber identity module (hereinafter referred to as "USIM") is increased. That is, the amount of computation required for the symmetric key-based AKA method is much greater than the amount of computation required for the public key-based AKA method. Accordingly, in the case where the symmetric key-based AKA method is used in a USIM that is restricted in the amount of computation, it is difficult to process the required amount of computation.

SUMMARY OF THE INVENTION

To address the above-discussed deficiencies of the prior art, it is a primary object to provide an authentication method in a communication system.

In order to accomplish the above and other objects, there is provided an authentication method in a communication system, according to the present invention, which includes the steps of: a first portable device, in order to request an authenticated communication, generating and transmitting a first random number and a first timestamp for the first random number to a first universal subscriber identity module (USIM) included in the first portable device; the first USIM calculating a first sign for the first portable device using the first random number and the first timestamp, and transmitting the calculated first sign to the first portable device; the first portable device requesting authentication for the authenticated communication from a second portable device through transmission of the first random number, the first timestamp, and the first sign to the second portable device; the second portable device, if the first timestamp is effective, generating a second random number and a second timestamp for the second random number, and transmitting the first random number, the second random number, the first timestamp, the second timestamp, and the first sign to a second USIM included in the second portable device; the second USIM, if the first random number, the first timestamp, and the first sign are effective, generating a second sign for the second portable device and a second personal key for the authenticated communication using the second random number and the second timestamp, and transmitting the second sign and the second personal key; the second portable device transmitting the second random number, the second timestamp, and the second sign to the first portable device; the first portable device, if the second timestamp is effective, transmitting the second random number, the second timestamp, and the second sign to the first USIM; and the first USIM, if the second sign is effective, generating and transmitting a first personal key for the authenticated communication to the first portable device.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior uses, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 2A and 2B are flowcharts illustrating an authentication process for an authenticated communication between portable device #A and portable device #B as illustrated in FIG. 1.

DETAILED DESCRIPTION OF THE INVENTION

Figure 1:
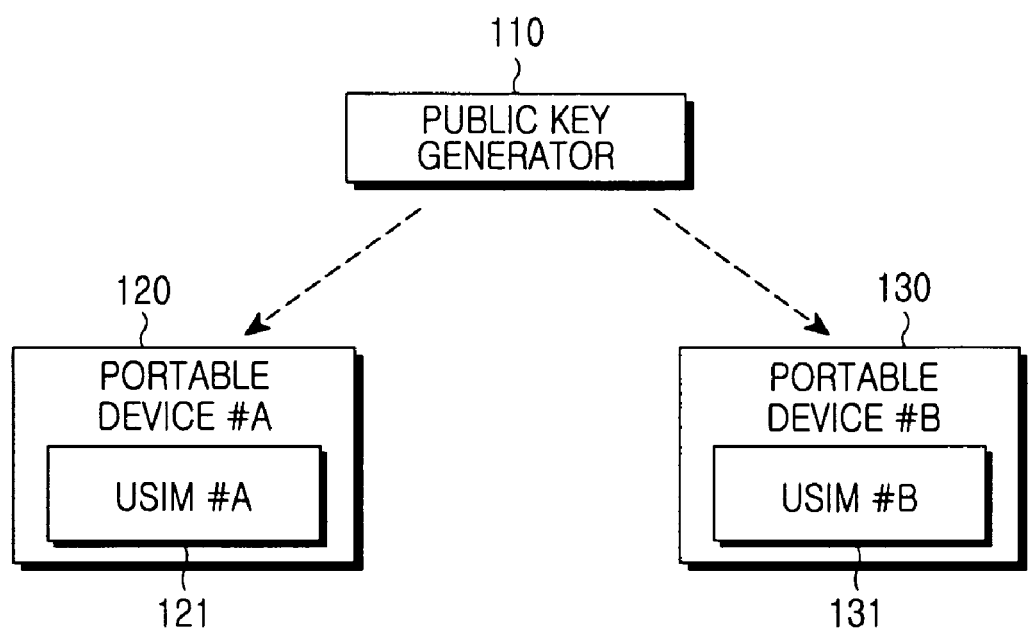
FIG. 1 is a view illustrating the construction of an authentication system in a communication system according to an embodiment of the present invention.

FIGS. 1 through 2B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

FIG. 1 is a view illustrating the construction of an authentication system in a communication system according to an embodiment of the present invention.

Referring to FIG. 1, the authentication system includes a public key generator (hereinafter referred to as a "PKG") 110, and a plurality of portable devices, for example, portable device #A 120 and portable device #B 130. Here, portable device #A 120 includes universal subscriber identity module (USIM) #A 121, and portable device #B 130 includes USIM #B 131.

The PKG 110, if it detects that a user authentication is required, generates a personal key for a user identifier (ID), and transmits the generated personal key to a user. Here, the user may be a portable device or a USIM included in the portable device. In an embodiment of the present invention, for convenience in explanation, it is defined that the user corresponds to a portable device. Also, the PKG 110 generates a personal key for the portable device, the ID of which is i, as in Equation 1. Hereinafter, for convenience in explanation, the portable device of which the ID is i is called portable device #i:

$$S_i = sH(ID_i).$$  [Eqn. 1]

In Equation 1, $S_i$ denotes a personal key of portable device #i, $H(ID_i)$ denotes a public key of portable device #i, s denotes a shared key for all users in the system, that is provided by the PKG 110, and H denotes a hash function for mapping a certain string $\{0,1\}^*$ on an addition group $G_1$. The hash function H can be expressed as in Equation 2:

$$H: \{0,1\}^* \to G_1.$$  [Eqn. 2]

In Equation 2, $G_1$ denotes a group of points on an elliptical curve $E(F_q)$.

The PKG 110 as described above generates and transmits a personal key for portable device #i to portable device #i at a time point where portable device #i is initially registered in the communication system. As needed in the communication system, the PKG 110 may generate the personal key for portable device #i, and transmit the generated personal key to portable device #i.

On the other hand, if it is assumed that, in FIG. 1, a personal key generated by the PKG 110 for portable device #A 120 is $S_A$, and a personal key generated for portable device #B 130 is $S_B$, we have $S_A = sH(ID_A)$ and $S_B = sH(ID_B)$.

Also, portable #i already knows the hash function H, and if the personal key $S_i$ is received from the PKG 110, it can generate a public key $H(ID_i)$ for portable device #i using the personal key $S_i$ and the hash function H.

On the other hand, portable device #A 120 in FIG. 1 already knows the hash function H, and if the personal key $S_A$ is received from the PKG 110, it can generate a public key $H(ID_A)$ for portable device #A 120 using the personal key $S_A$ and the hash function H. Also, portable device #B 130 in FIG. 1 already knows the hash function H, and if the personal key $S_B$ is received from the PKG 110, it can generate a public key $H(ID_B)$ for portable device #B 130 using the personal key $S_B$ and the hash function H.

Portable device #i transmits the generated public key $H(ID_i)$ to USIM #i (i.e., the USIM of portable device #A 120 in FIG. 1).

Figure 2A:
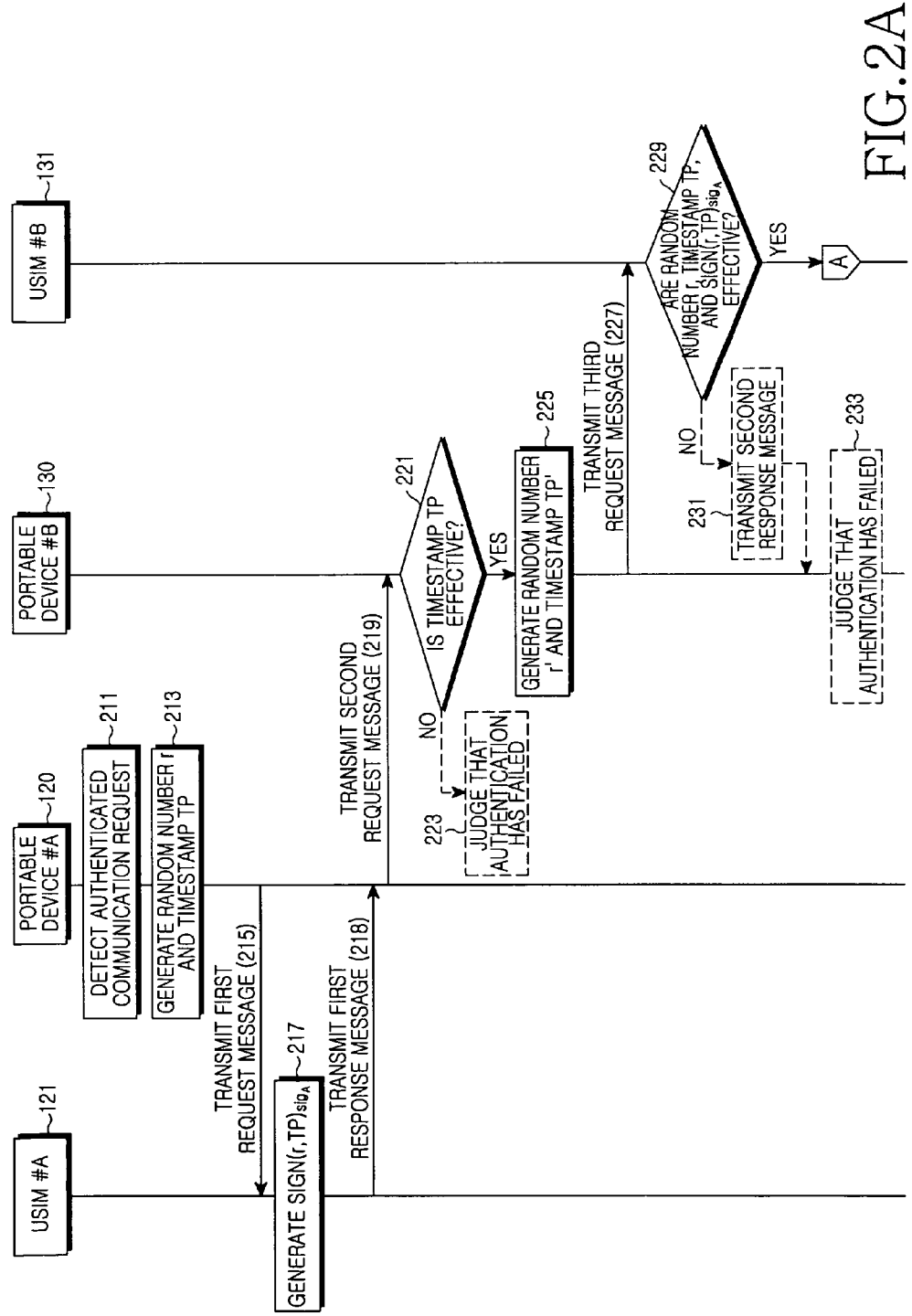

FIGS. 2A and 2B are flowcharts illustrating an authentication process for an authenticated communication between portable device #A 120 and portable device #B 130 as illustrated in FIG. 1.

Referring to FIGS. 2A and 2B, if portable device #A 120 detects an authenticated communication request (step 211), it generates a random number r and a timestamp TP (step 213). Portable device #A 120 transmits a first request message that includes the random number r and the timestamp TP to USIM #A 121 included in portable device #A 120 (step 215). USIM #A 121 receives the first request message, and detects the random number r and the timestamp TP included in the first request message. Then, USIM #A 121 generates $(r,TP)_{sig_A}$ (i.e., a sign of portable device #A 120) using the detected random number r and the timestamp TP (step 217). USIM #A 121 includes the generated sign $(r,TP)_{sig_A}$ in a first response message (i.e., a response message to the first request message) and transmits the first response message to portable device #A 120 (step 218).

Portable device #A 120 transmits a second request message for requesting authenticated communication to portable device #B 130 (step 219). Here, the second request message includes the random number r, the timestamp TP, and the sign $(r,TP)_{sig_A}$. Portable device #B 130 receives the second request message, and detects the random number r, the timestamp TP, and the sign $(r,TP)_{sig_A}$ included in the second request message. Then, portable device #B 130 judges whether the detected timestamp TP is effective (step 221). Portable device #B 130 performs the following authenticated communication only in the case where the detected timestamp TP is effective. If the detected timestamp TP is not effective, portable device #B 130 judges that the authentication for the authenticated communication has failed (step 223).

On the other hand, if the detected timestamp TP is effective, portable device #B 130 generates a random number r' that is different from the random number r, and a timestamp TP' that is different from the timestamp TP (step 225). Then, portable device #B 130 transmits a third request message, which includes the random number r, the random number r', the timestamp TP, the timestamp TP', and the sign $(r,TP)_{sig_A}$, to USIM #B 131 included in portable device #B 130 (step 227)

USIM #B 131 receives the third request message, and detects the random number r, the random number r', the timestamp TP, the timestamp TP', and the sign $(r,TP)_{sig_A}$ from the received third request message. USIM #B 131 judges whether the random number r, the timestamp TP, and the sign $(r,TP)_{sig_A}$ are effective using the public key of USIM #A 121 (step 229). If the random number r, the timestamp TP, and the sign $(r,TP)_{sig_A}$ are not effective, USIM #B 131 transmits a second response message indicating that the random number r, the timestamp TP, and the sign $(r,TP)_{sig_A}$ are not effective to portable device #B 130 (step 231). Portable device #B 130, if the second response message is received from the USIM #B 131, judges that the authentication for the authenticated communication has failed (step 233).

On the other hand, if the random number r, the timestamp TP, and the sign $(r,TP)_{sig_A}$ are effective, USIM #B 131 generates $(r',TP')_{sig_B}$ (i.e., a sign of portable device #B 130) and $(r+r')sH(ID_B)$ (i.e., a personal key of portable device #B 130) using the random number r' and the timestamp TP' (step 235). USIM #B 131 transmits a third response message that includes the sign $(r',TP')_{sig_B}$ and the personal key $(r+r')sH(ID_B)$ to portable device #B 130 (step 237).

Portable device #B 130 receives the third response message, and detects the sign $(r',TP')_{sig_B}$ and the personal key $(r+r')sH(ID_B)$. Then, portable device #B 130 transmits a fourth response message that includes the random number r', the timestamp TP', and the sign $(r',TP')_{sig_B}$ to portable device #A 120 (step 239). Portable device #A 120 receives the fourth response message, and detects the random number r', the timestamp TP', and the sign $(r',TP')_{sig_B}$. Then, portable device #A 120 judges whether the detected time stamp TP' is effective (step 241). If the time stamp TP' is not effective, portable device #A 120 judges that the authentication for the authenticated communication has failed (step 243).

On the other hand, if the timestamp TP' is effective, portable device #A 120 includes the random number r', the timestamp TP', and the sign $(r',TP')_{sig_B}$ in a fifth request message, and transmits the fifth request message to USIM #A 121 (step 245). USIM #A 121 detects the sign $(r',TP')_{sig_B}$ included in the fifth request message, and judges whether the sign $(r',TP')_{sig_B}$ is effective (step 247). If the sign $(r',TP')_{sig_B}$ is not effective, USIM #A 121 transmits a sixth response message indicating that the sign $(r',TP')_{sig_B}$ is not effective to portable device #A 120 (step 249). Portable device #A 120, if it receives the sixth message, judges that the authentication for the authenticated communication has failed (step 251).

On the other hand, if the sign $(r',TP')_{sig_B}$ is effective, USIM #A 121 generates a personal key $(r+r')sH(ID_A)$ (step 253). Then, USIM #A 121 includes the generated personal key $(r+r')sH(ID_A)$ in a fifth response message, and transmits the fifth response message to portable device #A 120 (step 255). If the process up to step 255 is completed, the authenticated communication between portable device #A 120 and portable device #B 130 becomes possible.

If the authentication process for the authenticated communication as described above is successfully completed, the personal key of portable device #A 120 becomes $(r+r')sH(ID_A)$, and the personal key of portable device #B 130 becomes $(r+r')sH(ID_B)$. Also, portable device #A 120 and portable device #B 130 share public information, such as the personal key of portable device #A 120 $(r+r')sH(ID_A)$ and the personal key of portable device #B 130 $(r+r')sH(ID_B)$ Accordingly, a pair of public keys used for the authenticated communication between portable device #A 120 and portable device #B 130 is changed. For example, in the existing authentication process for the authenticated communication, a pair of public keys of portable device #A 120 is changed to $H(ID_A),sH(ID_A)$ or $r''H(ID_A),sr''H(ID_A)$. Here, $r''=r+r'$.

As described above, in the embodiment of the present invention, operations performed by the USIM include signing for the generated random number r and the timestamp TP, verifying the generated sign, and generating a temporary personal key $rs''H(ID)$ through multiplication of the personal key $sH(ID)$ managed by the USIM with the random number $r''=(r+r')$.

Accordingly, in the embodiment of the present invention, a portable device performs all operations, except for the three operations as described above (for example, generation of a random number and a timestamp, multiplication of a random number r'' with a public parameter, signing of a message using a temporary personal key, authentication, encryption, such as a key agreement for generating a session key, and the like). Table 1 below indicates the amount of computation for operations performed by USIM.

TABLE 1

| Type | Input Value | | | Output Value | | Remarks |
|---|---|---|---|---|---|---|
| REQ1 | r, TP | | | | $(r, TP)_{sig}$ | Sign for requested input value |
| REQ2 | r, TP | $(r, TP)_{sig}$ | r', TP' | $(r + r')sH(ID)$ | $(r', TP')_{sig}$ | Examine effectiveness of TP and TP' |
| REQ3 | r', TP' | $(r', TP')_{sig}$ | | $(r + r')sH(ID)$ | | Possible if r and TP generated in REQ1 exists |

In Table 1, REQ1 indicates an operation that should be performed by the USIM in association with the first request message, REQ2 indicates an operation that should be performed by the USIM in association with the third request message, and REQ3 indicates an operation that should be performed by the USIM in association with the fifth request message.

As described above, in the communication system according to the present invention, in generating public keys required for authentication between a first portable device including a first USIM and a second portable device including a second USIM, the first portable device and the second portable device perform a part of the authentication operations that is required to generate the public keys, and the first USIM and the second USIM perform the remaining parts of the authentication operations. Accordingly, in performing the authentication for the public key-based authenticated communication, the operations performed by the first USIM and the second USIM can be reduced, and thus the loads of the first USIM and the second USIM can also be reduced.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An authentication method in a communication system, comprising:
   generating and providing, at a first portable device, a first random number and a first timestamp to a first universal subscriber identity module (USIM) included in the first portable device when an authenticated communication request is detected;
   calculating and providing, at the first USIM, a first sign for the first portable device using the first random number and the first timestamp to the first portable device;
   requesting, by the first portable device, authentication for the authenticated communication by transmitting the first random number, the first timestamp, and the first sign to a second portable device;
   generating, at the second portable device, a second random number and a second timestamp when the first timestamp is effective, and providing the first random number, the second random number, the first timestamp, the second timestamp, and the first sign to a second USIM included in the second portable device;
   generating, at the second USIM, a second sign for the second portable device and a second personal key for the authenticated communication using the second random number and the second timestamp when the first random number, the first timestamp, and the first sign are effective, and providing the second sign and the second personal key to the second portable device;
   providing, by the second portable device, the second random number, the second timestamp, and the second sign to the first portable device;
   providing, at the first portable device, the second random number, the second timestamp, and the second sign to the first USIM when the second timestamp is effective; and
   generating and providing, at the first USIM a first personal key for the authenticated communication to the first portable device when the second sign is effective.

2. The authentication method as claimed in claim 1, further comprising determining, at the second portable device, that the authentication for the authenticated communication has failed when the first timestamp is not effective.

3. The authentication method as claimed in claim 1, further comprising:
   when the first random number, the first timestamp, and the first sign are not effective, reporting, by the second USIM, that one or more of the first random number, the first timestamp, and the first sign are not effective to the second portable device; and when one or more of the first random number, the first timestamp, and the first sign are reported as not being effective, determining, by the second portable device, that the authentication for the authenticated communication has failed.

4. The authentication method as claimed in claim 1, further comprising determining, by the first portable device, that the authentication of the authenticated communication has failed when the second timestamp is not effective.

5. The authentication method as claimed in claim 1, further comprising:
reporting, by the first USIM, that the second sign is not effective to the first portable device when the second sign is not effective; and
determining, by the first portable device, that the authentication for the authenticated communication has failed when the second sign is reported as not being effective.

6. The authentication method as claimed in claim 1, wherein the first and second personal keys are calculated by a following equation, $$(r+r')sH(\text{ID})$$

where, r denotes the first random number, r' denotes the second random number, s denotes a shared key for all users in a system, H denotes a hash function, and ID denotes a user identifier.

7. An authentication method in a communication system, the authentication method comprising:
receiving, at a second portable device, an authentication request for an authenticated communication, the authentication request comprising a first random number, a first timestamp, and a first sign from a first portable device;
generating, at the second portable device, a second random number and a second timestamp when the first timestamp is determined to be effective;
providing the first random number, the second random number, the first timestamp, the second timestamp, and the first sign to a universal subscriber identity module (USIM) included in the second portable device;
generating, at the USIM, a second sign for the second portable device and a personal key for the authenticated communication using the second random number and the second timestamp when the first random number, the first timestamp, and the first sign are determined to be effective;
providing the second sign and the personal key to the second portable device; and
transmitting, at the second portable device, the second random number, the second timestamp, and the second sign to the first portable device.

8. The authentication method as claimed in claim 7, further comprising determining, by the second portable device, that the authentication for the authenticated communication has failed when the first timestamp is determined to not be effective.

9. The authentication method as claimed in claim 7, further comprising:
determining, by the USIM, whether the first random number, the first timestamp, and the first sign are effective; and
determining, by the second portable device, that the authentication for the authenticated communication has failed when at least one of the first random number, the first timestamp, and the first sign is determined to not be effective by the USIM.

10. The authentication method as claimed in claim 7, further comprising, when at least one of the first random number, the first timestamp, and the first sign is not effective, reporting, at the USIM, that the corresponding at least one first random number, the first timestamp, and the first sign is not effective to the second portable device.

11. The authentication method as claimed in claim 10, further comprising determining, by the second portable device, that the authentication for the authenticated communication has failed when the USIM reports that at least one of the first random number, the first timestamp, and the first sign is not be effective.

12. The authentication method as claimed in claim 1, wherein the personal key is calculated by a following equation, $$(r+r')sH(\text{ID})$$

where, r denotes the first random number, r' denotes the second random number, s denotes a shared key for all users in a system, H denotes a hash function, and ID denotes a user identifier.

13. An apparatus for establishing authenticated communication in a communication system, the apparatus comprising:
a first portable device, when detecting a request to initiate an authenticated communication request, configured to:
generate and provide a first random number and a first timestamp to a universal subscriber identity module (USIM) included in the first portable device,
transmit an authentication request for the authenticated communication to a second portable device, the authentication request comprising a first random number, a first timestamp, and a first sign provided from the USIM,
receive a response to the authentication request, the received response comprising a second random number, a second timestamp, and a second sign,
provide the second random number, the second timestamp, and the second sign to the USIM when the second timestamp is effective, and
establish the authenticated communication with the second portable device using a first personal key provided by the USIM,
wherein the first portable device is further configured to use the USIM to calculate the first sign based on the first random number and the first timestamp, and generate the first personal key for the authenticated communication when the second sign is effective.

14. The apparatus of claim 13, wherein the first portable device is further configured to determine that the authentication for the authenticated communication has failed when the second timestamp is not effective.

15. The apparatus of claim 13, wherein the first portable device is further configured to use the USIM to determine whether the second sign is effective, and
wherein the first portable device is further configured to determine that the authentication for the authenticated communication has failed when the second sign is not effective.

16. The apparatus of claim 13, wherein the first portable device, when receiving an authentication request for an authenticated communication initiated by another portable device, is further configured to:
receive the authentication request for the authenticated communication initiated by the other portable device, the authentication request comprising a third random number, a third timestamp, and a third sign,
generate a fourth random number and a fourth timestamp when the third timestamp is determined to be effective, provide the third random number, the fourth random number, the third timestamp, the fourth timestamp, and the third sign to the USIM, and transmit the fourth random number, the fourth timestamp, and the fourth sign to the other portable device, wherein the first portable device is further configured to use the USIM to generate a fourth sign and a second personal key for the authenticated communication initiated by the other portable device using the fourth random number and the fourth timestamp when the third random number, the third timestamp, and the third sign are determined to be effective.

17. The apparatus of claim 16, wherein the first portable device is further configured to determine that the authentication for the authenticated communication initiated by the other portable device has failed when the third timestamp is not effective.

18. The apparatus of claim 16, wherein the first portable device is further configured to use the USIM to determine whether at least one of the first random number, the first timestamp, and the first sign is not effective.

19. The apparatus of claim 18, wherein the second portable device is further configured to determine that the authentication for the authenticated communication initiated by the other portable device has failed when at least one of the first random number, the first timestamp, and the first sign is determined to not be effective.

20. The apparatus of claim 13, wherein the first portable device is further configured to use the USIM to calculate the first personal key according to the following equation, $$(r+r')sH(ID)$$

where, r denotes the first random number, r' denotes the second random number, s denotes a shared key for all users in a system, H denotes a hash function, and ID denotes a user identifier.

21. The apparatus of claim 16, wherein the first portable device is further configured to use the USIM to calculate the second personal key according to the following equation, $$(r+r')sH(ID)$$

where, r denotes the first random number, r' denotes the second random number, s denotes a shared key for all users in a system, H denotes a hash function, and ID denotes a user identifier.

* * * * *